United States Patent [19]

Ikeda

[11] Patent Number: 4,917,272
[45] Date of Patent: Apr. 17, 1990

[54] DETERGENT SUPPLY APPARATUS FOR WASHING MACHINE AND THE LIKE AND WASHING MACHINE USING THE SAME

[75] Inventor: Yoshio Ikeda, Aichi, Japan

[73] Assignee: Kabushiki Kaisha Toshiba, Kawasaki, Japan

[21] Appl. No.: 249,270

[22] Filed: Sep. 26, 1988

Related U.S. Application Data

[63] Continuation of Ser. No. 11,217, Feb. 5, 1987, abandoned.

[30] Foreign Application Priority Data

Feb. 6, 1986 [JP] Japan .................................. 61-24524
Feb. 12, 1986 [JP] Japan .................................. 61-28235

[51] Int. Cl.⁴ ............................................. G01F 11/00
[52] U.S. Cl. ..................................... 222/231; 222/236; 68/17 R
[58] Field of Search ................ 222/144.5, 145, 153, 222/181, 185, 231, 236, 325, 413, 651, DIG. 1, 129.1, 132; 68/17 R

[56] References Cited

U.S. PATENT DOCUMENTS

| 580,644 | 4/1897 | Ham | 222/231 |
|---|---|---|---|
| 3,120,329 | 2/1964 | Noakes | 222/651 X |
| 3,268,119 | 8/1966 | Kopera | 222/129.1 |
| 4,076,363 | 2/1978 | Pechard et al. | 439/353 |
| 4,188,807 | 2/1980 | Graf et al. | 68/17 R |
| 4,207,995 | 6/1980 | Neely | 222/231 |
| 4,370,053 | 1/1983 | Hirayama et al. | 222/DIG. 1 |
| 4,456,154 | 6/1984 | Herriman | 222/325 |
| 4,461,405 | 7/1984 | Adamson | 222/201 |
| 4,487,337 | 12/1984 | DeJardins | 222/236 |
| 4,491,161 | 1/1985 | Tamura et al. | 222/DIG. 1 |
| 4,560,093 | 12/1985 | Cassia | 222/325 X |
| 4,650,097 | 3/1987 | Hagihara et al. | 222/DIG. 1 |

FOREIGN PATENT DOCUMENTS

4218769 4/1964 Japan .
5443827 12/1975 Japan .

OTHER PUBLICATIONS

Patent Publication No. 51—33354 Published Sep. 18, 1976, Inventors; Mitsuaki Awazu et al.

Primary Examiner—Michael S. Huppert
Attorney, Agent, or Firm—Cushman, Darby & Cushman

[57] ABSTRACT

A detergent supply apparatus includes a detergent storage compartment for storing a powdery detergent, and a conveying device for conveying the powdery detergent from the detergent storage compartment. The conveying device includes a coiled member having a hollow body and an open end. When the conveying device is rotated, the detergent fed from the detergent storage compartment to the hollow body of coiled member is conveyed by coiled member, and then is discharged from the open end of the coiled member.

4 Claims, 7 Drawing Sheets

DETERGENT SUPPLY APPARATUS FOR WASHING MACHINE AND THE LIKE AND WASHING MACHINE USING THE SAME

This is a continuation of application Ser. No. 07/011,217, filed Feb. 5, 1987, which was abandoned upon the filing hereof.

BACKGROUND OF THE INVENTION

1. Field of the Invention

The present invention relates, in general, to detergent supply apparatus. More, specifically, the invention relates to a detergent supply apparatus in which powdery detergent is stored. The detergent supply apparatus is attached to a washing machine, and dispenses a proper amount of the detergent into the washing machine.

2. Description of the prior art

Detergent supply apparatus for supplying powdery detergent to a washing machine have been developed. However, a desirable detergent supply apparatus has not been available previously.

An example of a detergent supply apparatus is disclosed in Japanese Patent Application No. 50-152340 (Patent Publication No. 54-43827) filed Dec. 20, 1975, and entitled DETERGENT SUPPLY DEVICE CAPABLE OF SUPPLYING FIXED AMOUNT FOR WASHING MACHINE. This prior art shows a detergent supply device having a hopper compartment in which powdery detergent is stored. The detergent supply device also includes a storage compartment in which the detergent from the hopper compartment is stored temporarily. The storage compartment receives a fixed amount of the detergent from the hopper compartment, and then discharges all the detergent therein into the washing machine in response to activation of the machine by a user. This device may dispense a fixed amount of the powdery detergent into the washing machine. However, since the powdery detergent in the hopper and storage compartments is exposed to moisture and water vapor within the washing machine, the powdery detergent is apt to cake during storage.

The above-described detergent supply device has no effective solution to solve the problem described above.

Another example of a detergent supply apparatus is disclosed in Japanese Patent Application No. 39-23280 (Patent Publication No. 42-18769) filed Apr. 23, 1964, and entitled AUTOMATIC DETERGENT DISPENSER. In this prior art, a screw member is used to act as a detergent convey mechanism. The screw member is rotated by an impeller. The impeller is driven by the water which is fed to the washing machine. Therefore, a proper amount of detergent corresponding to the amount of water fed to the washing machine may be supplied to the washing machine.

According to this prior art, the powdery detergent is agitated, and then is broken down by the screw member during the conveyance by the screw member.

Thus, the detergent dispenser described above may supply the washing machine with the powdery detergent more smoothly as compared with the prior art previously described.

In this prior art, however, since there is a great possibility that a fair amount of the detergent may adhere on the surface of the screw member, the detergent dispenser also may not achieve a desirable result. Furthermore, it is not easy to remove the detergent adhered on the surface of the screw member because of the complicated configuration of the screw member. Therefore, this result causes the detergent to further accumulate on the surface of the screw member.

SUMMARY OF THE INVENTION

It is an object of the present invention to smoothly supply a powder detergent from a detergent supply apparatus.

It is another object of the present invention to easily remove the detergent adhered on the inside of a detergent supply apparatus.

To accomplish the above objects, a detergent supply apparatus includes a storage compartment for storing a powdery detergent, and a conveying device driven by a driving device for conveying the detergent stored in the storage compartment. The conveying device includes a coiled member having a hollow inner portion where the detergent from the storage compartment is temporarily stored, and an open end from which the detergent is discharged.

The detergent supply appartus may include a stirring device positioned in the storage compartment for stirring the detergent in the storage compartment.

BRIEF DESCRIPTION OF THE DRAWINGS

The present invention is best understood with reference to accompanying drawings in which.

DETAILED DESCRIPTION OF THE PREFERRED EMBODIMENTS

Figure 1:
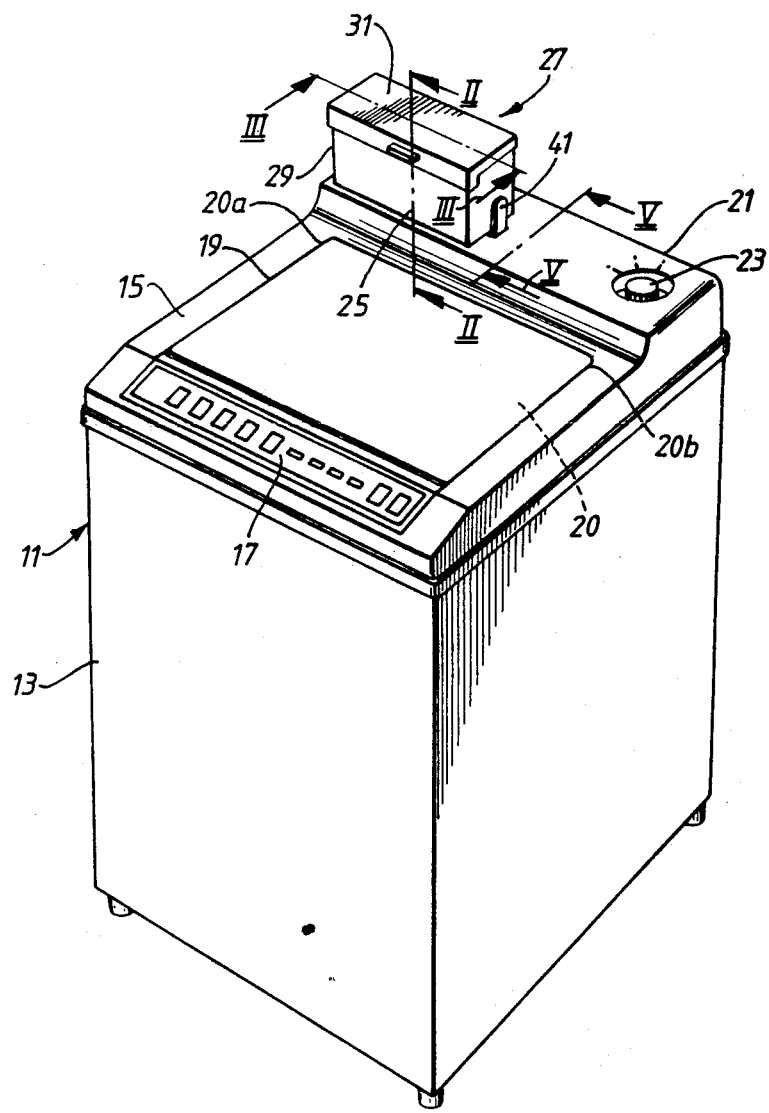
FIG. 1 is a perspective view illustrating a washing machine using one embodiment of a detergent supply apparatus of the present invention.

The preferred embodiments of the present invention will now be described in more detail with reference to the accompanying drawings. FIG. 1 is a perspective view of a washing machine using the detergent supply apparatus of one embodiment of the present invention. A washing machine 11 is composed of an outer casing 13 and an upper cover 15 mounted on outer casing 13. An operation panel 17 on which several kinds of operation keys are provided is located on the front-most part of upper cover 15. An access opening 20 is provided at the middle part of upper cover 15. The rear-most portion of a lid 19 is hinged to access opening edges 20a and 20b to open and close access opening 20 of upper cover 15. Lid 19 alows a user easy access to the inside of washing machine 11 through access opening 20. A raised portion 21 is integrally formed at the rear-most part of upper cover 15. A water level set knob 23 is rotatably provided at the right side of raised portion 21 of upper cover 15.

A setting opening 25 is formed at the left side of raised portion 21 of upper cover 15. A detergent supply apparatus 27 is positioned in setting opening 25. Detergent supply apparatus 27 includes a storage body 29 and a lid 31.

Figure 2:
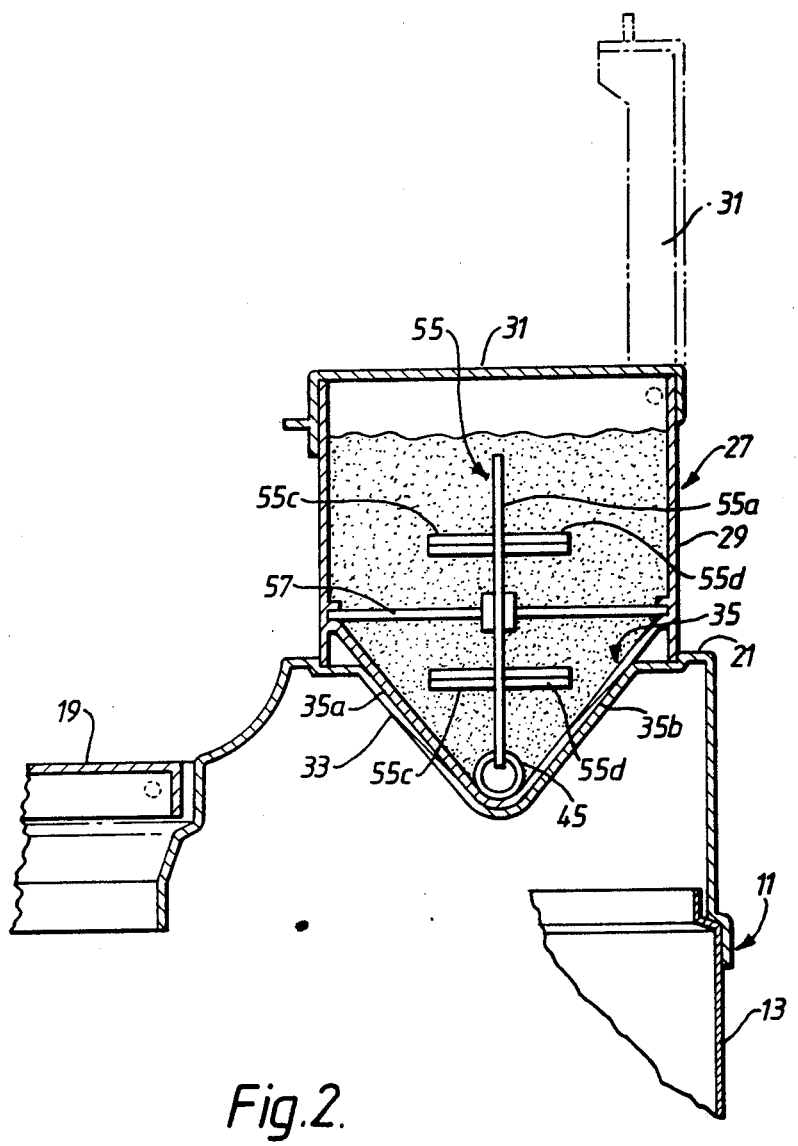
FIG. 2 is a sectional view taken in the direction of the arrows along the line II—II of FIG. 1.

As can be seen in FIG. 2, opposite ends of a V-shaped supporting member 33 are connected to corresponding edges of raised portion 21 which defines setting opening 25. Both side ends of V-shaped supporting member 33 open along the elongated direction of raised portion 21.

The construction of detergent supply apparatus 27 will be described in more detail with reference to FIGS. 2 and 3.

A hopper 35 is formed inside storage body 29. Each upper edge of side walls 35a, 35b, 35c and 35d of hopper 35 is integrally connected to a corresponding side wall of storage body 29. Side walls 35a, 35b, 35c and 35d of hopper 35 are slanted inwardly, and extend downwardly toward the bottom portion of hopper 35. In particular, side walls 35a and 35b opposite to one another are formed to be fitted to corresponding walls of V-shaped supporting member 33 when detergent supply apparatus 27 is mounted on supporting member 33 through setting opening 25 of raised portion 21.

Figure 3:
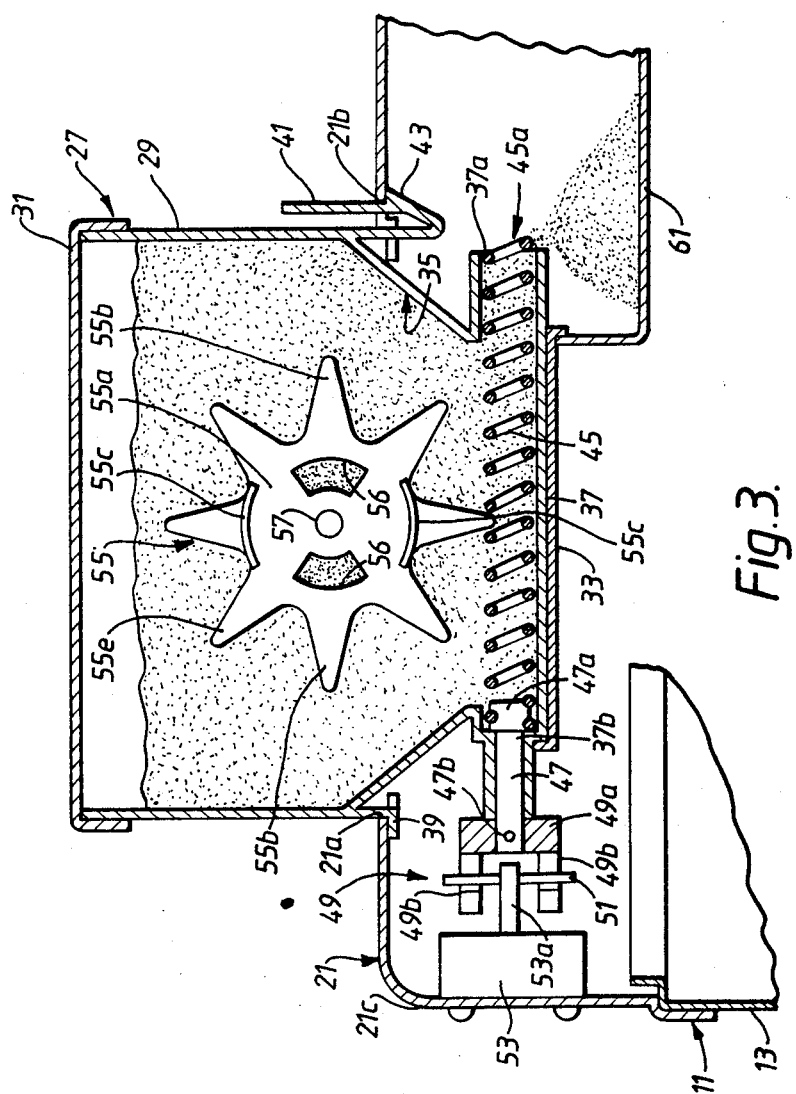
FIG. 3 is a sectional view taken in the direction of the arrows along the line III—III of FIG. 1.

As can be seen in FIG. 3, a feeding duct 37 is integrally formed at the bottom portion of hopper 35 along the elongated direction of storage body 29. Feeding duct 37 includes open ends 37a and 37b, and the middle portion thereof is communicated with hopper 35. Therefore, the powdery detergent stored in storage body 29 may be discharged from one open end 37a of feding duct 37 through hopper 35.

In FIG. 3, a left pawl member 39 projects outward from the bottom edge of the left side wall of storage body 29. The bottom edge of the right side wall of storage body right side wall to form an elastic operation konb 41. A right pawl member 43 projects outward from the middle portion of operation knob 41. When detergent supply apparatus 27 is set into V-shaped supporting member 33 through setting opening 25 of raised portion 21, left pawl member 30 is engaged with the left side aperture edge 21a of raised portion 21, and right pawl member 43 is then engaged with the right side aperture edge 21b of raised portion 21 for firmly fixing detergent supply apparatus 27 to washing machine 11.

As can be seen in FIG. 3, a coiled member 45 is rotatably arranged in feeding duct 37 along the extending direction of feeding duct 37 to act as conveying means. A hollow body 45a is established by coiled memmber 45, and thus, extends to both the ends of coiled member 45. Coiled member 45 has a predetermined pitch greater than the diameter of the wire of coiled member 45. Coiled member 45, thereby, allows the detergent fed from hopper 35 to enter into hollow body 45a thereof through the interval pitch described above.

One end of coiled member 45 extends to open end 37a of feeding duct 37. The other end of coiled member 45 extends to the other open end 37b of feeding duct 37, whereupon the other end of coiled member 45 is firmly connected to one end 47a of a connecting shaft 47.

The other end 47b of connecting shaft 47 is firmly fixed to the body 49a of a coupling member 49. A pair of U-shaped members 49b are integrally formed to the body 49a of coupling member 49, as shown in FIG. 3.

A driving device 53 is attached to the left side inner wall 21c of raised portion 21.

The U-shaped member pair 49b of coupling member 499 is operably engaged with a coupling bar 51 perpendicularly fixed to driving shaft 53a of driving device 53 when detergent supply apparatus 27 is mounted on V-shaped supporting member 33 of raised portion 21.

In FIGS. 2 and 3, a stirring device 55 is rotatably arranged in storage body 29 of detergent supply apparatus 27. Stirring device 55 includes a disc plate 55a, a plurality of gear members 55b projecting from plate 55a and two pairs of curved stirring blades 55c and 55d.

Gear members 55b radially project at regular intervals from disc plate 55a. Each gear member 55b is formed such that it becomes gradually smaller in width from disc plate 55a toward the projecting top 55e thereof. A pair of opposing curved stirring blades 55c perpendicularly project from the one surface of disc plate 55a. The other pair of opposing curved stirring blades 55d also perpendicularly project from the other surface of disc plate 55a, as shown in FIG. 2.

A pair of apertures 56 are formed in disc plate 55a, and are symmetrically arranged with respect to the center of disc plate 55a. Those apertures 56 allow gear members 55b to be shaped accurately by a molding process.

A rotation axle 57 penetrates the center of disc plate 55a, and both ends thereof are rotatably supported between opposite walls of storage body 29.

Under the construction described above, each gear member 55b has a proper projecting length to engage, in sequence, with the wire of coiled member 45 when coiled member 45 is rotated by driving device 53 through coupling member 49. Therefore, stirring device 55 is rotated when coiled member 45 rotates.

A lid 31 is hinged at the open end of storage body 29 of detergent supply apparatus 27 to open and close the open end of storage body 29.

Figure 5:
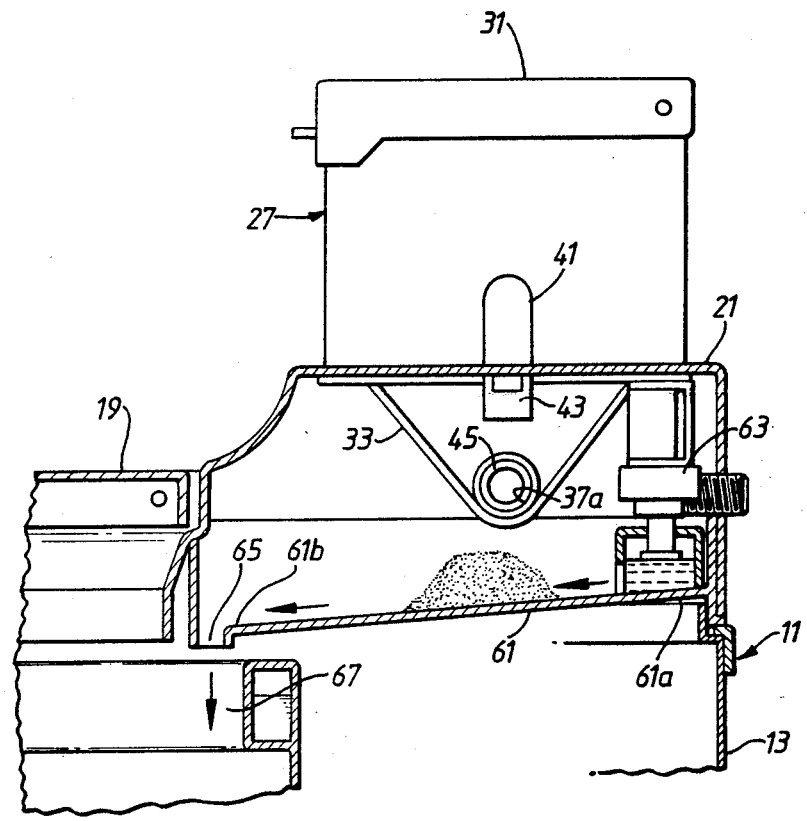
FIG. 5 is a sectional view taken in the direction of the arrows along the line V—V of FIG. 1.

As can be seen in FIG. 3, a detergent receiving channel 61 is provided under one open end 37a of feeding duct 37. Detergent receiving channel 61 receives the detergent discharged from open end 37a by coiled member 45. As shown in FIG. 5, a water supply valve 63 is provided on one end 61a of detergent receiving channel 61. A water supply opening 65 also is provided on the other end 61b of detergent receiving channel 61. Detergent receiving channel 61 declines from one end 61a where water supply valve 63 is provided toward the other end 61b where water supply opening 65 is formed. Water from water supply valve 63 flows along detergent receiving channel 61 to water supply opening 65. The water is discharged through water supply opening 65 into a washing tub 67 which is rotatably provided in washing machine 11. Therefore, the detergent on detergent receiving channel 61 is discharged into washing tube 67 with water from water supply valve 63, as described above.

The washing machine having the detergent supply apparatus described above operates as follows.

Firstly, a user sets a desired washing course by operating corresponding keys on operation panel 17. The user also sets an appropriate water level corresponding to the amount of clothes to be washed in washing tub 67 through water level set knob 23.

When the user operates the start key on operation panel 17, driving device 53 is energized prior to the commencement of the washing operation.

Driving device 53 rotates coiled member 45 located in feeding duct 37 in the spiral forwarding direction through coupling bar 51 and coupling member 49.

The detergent in the hollow body of coiled member 45 is moved forward to the one end 37a of feeding duct 37 upon the rotation of coiled member 45, and then is discharged from the one end 37a of feeding duct 37 to detergent receiving channel 61, as shown in FIGS. 3 and 5.

In this embodiment, water supply valve 63 is opened allowing water to flow onto channel 61 before the detergent is discharged from one end 37a of feeding duct 37. Therefore, the detergent discharged from feeding duct 37 is supplied to washing tube 67 with the water, as described above.

Furthermore, water supply valve 63 is closed at a predetermined time after the discharge of the detergent is completed.

Since the operations of water supply valve 63 as described above prevent the discharged detergent fromm adhering directly on the clothes in washing tub 67, the discoloration of the clothes can be prevented. Also, detergent accumulation or detergent adhesion on the surfce of detergent receiving channel 61 may be prevented.

The detergent stored in storage body 29 is supplied to the hollow body of coiled member 45 through hopper 35 and each pitch of spiral member 45 with the discharge of the detergent from feeding duct 37.

It should be noted that the discharge amount of the detergent corresponds to the water level set by water level set knob 23. The discharge amount of the detergent may be modified by changing the period of operation of driving device 53.

In this embodiment, the detergent stored in storage body 29 has been stirred by stirring device 55 during the rotation of coiled member 45. When coiled membmer 45 is rotated as described above, each gear member 55b of stirring device 55 is operably engaged, in sequence, with the wire of coiled member 45. Stirring device 55 is thereby rotated around rotation axle 57, and stirs the detergent in storage body 29 by stirring blades 55c and 55d. If detergent cakes exist in storage body 29, the detergent cakes are crushed by stirring blades 55c and 55d, and the resultant powdery detergent is fed to coiled member 45.

Figure 4:
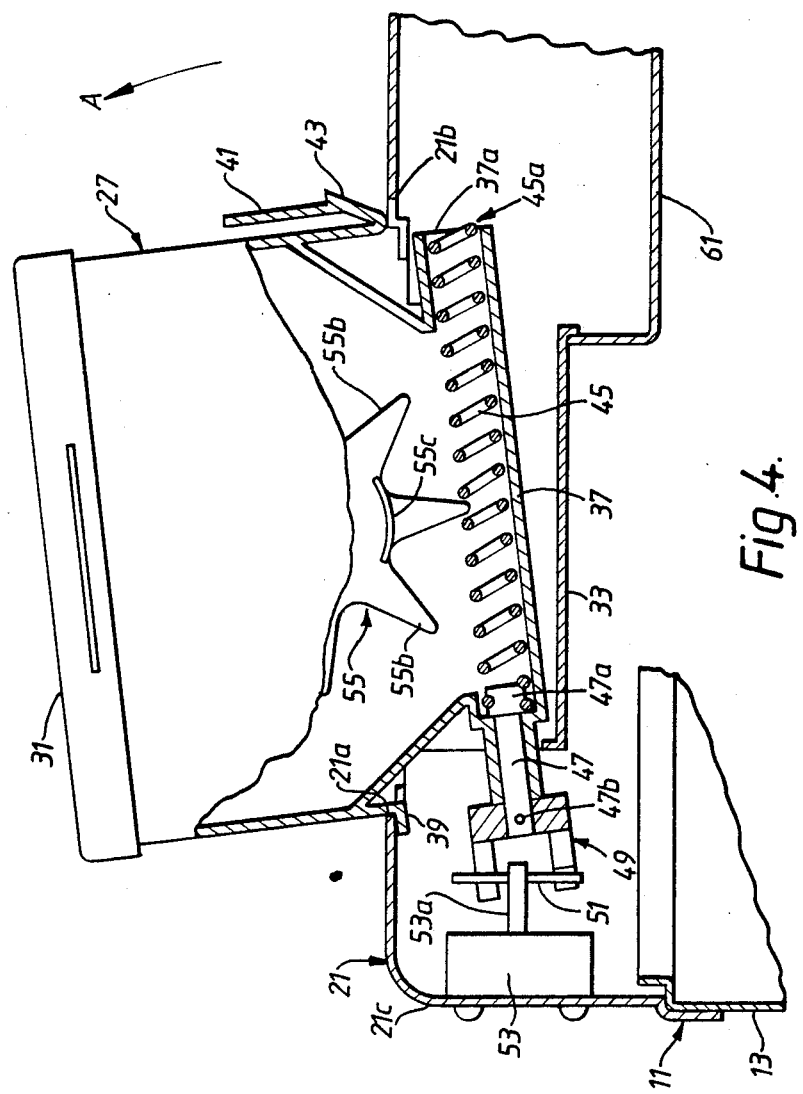
FIG. 4 is a fragmentary sectional view of the detergent supply apparatus shown in FIG. 1.

As can be seen in FIG. 4, detergent supply apparatus 27 is easily lifted from washing machine 11, when the user wants to clean the apparatus. First, right pawl member 43 is disengaged from right side aperture edge 21b of raised portion 21 by manually pressing operation knob 41. Detergent supply apparatus 27 is rotated around the engagement point, as a rotation center, between left pawl member 39 and left side aperture edge 21a of raised portion 21 in the direction indicated by arrow A in FIG. 4. Furthermore, when detergent supply apparatus 27 is slightly moved in the right hand direction, left pawl member 399 is disengaged from left side aperture edge 21a of raised portiono 21. At this time, since U-shaped member pairs 49a and 40b of coupling member 40 are disconnected from coupling bar 51 of driving device 53, detergent supply apparatus 27 may be lifted from setting opening 25.

According to one embodiment described above, since the coiled member is used as deterent convey means, the detergent stored in the storage body of detergent supply apparatus may be conveyed smoothly. The amount of the detergent adhered on thes eurface of the coiled member is fairly small, and no detergent becomes clogged in the coiled member as in the prior art. This is because the hollow body of the coiled member extends along the entire forward direction. Thus the contact area of coiled member 45 with detergent is small. Furthermore, since the detergent in the hollow body of the coiled member may be moved freely, if a caked detergent exists in the hollow body, it may be conveyed with the rotation of the coiled member. The rotation of the coiled member also causes the caked detergent to be broken into finer particles. In thi case, if the coiled member is designed such that the diameter thereof is larger than the pitch thereof, the caked detergent fed through between the adjacent wires of the coiled member may be conveyed readily in the hollow bod of the coiled member.

In addition, since the detergent stored in the storage body of detergent supply apparatus is stirred by the stirring device, the detergent in the storage body is less likely to become caked.

In this embodiment, since the contact area of the coiled member with detergent is small, as described above, the conveying force of the coiled member is smallerl tha that of the prior art. However, this problem is easily overcome by increasing the rotation speed of the coiled member. Furthermore, since a small amount of detergent is continuously conveyed by the coiled member, and is discharged to the detergent receiving channel, the discharged amount of detergent may be controlled easily. The small amount of the detergent discharged from the feeding duct may rapidly dissolve in the water fed from the water supply valve.

Figure 6:
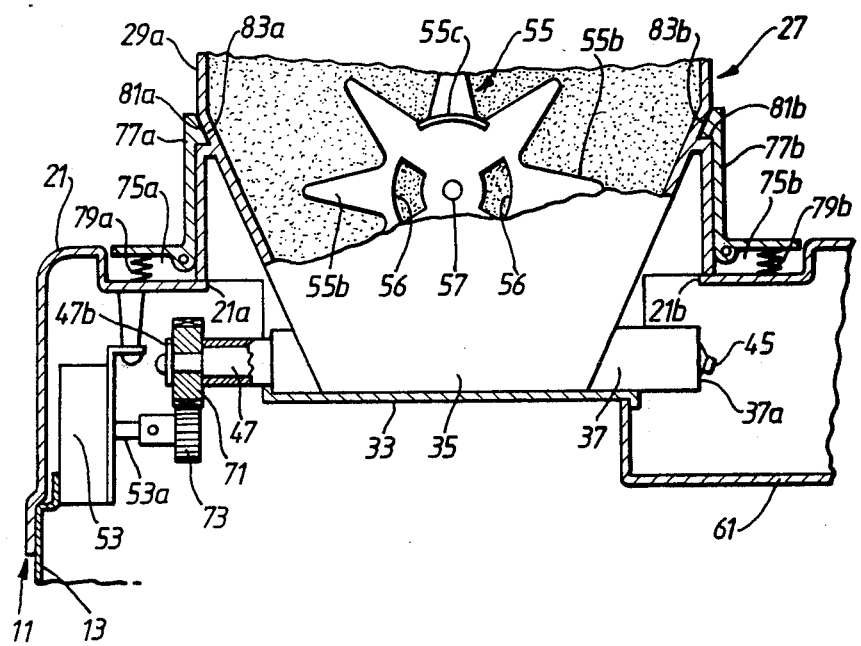
FIGS. 6 and 7 are fragmentary sectional views of another embodiment of the present invention.
Figure 7:
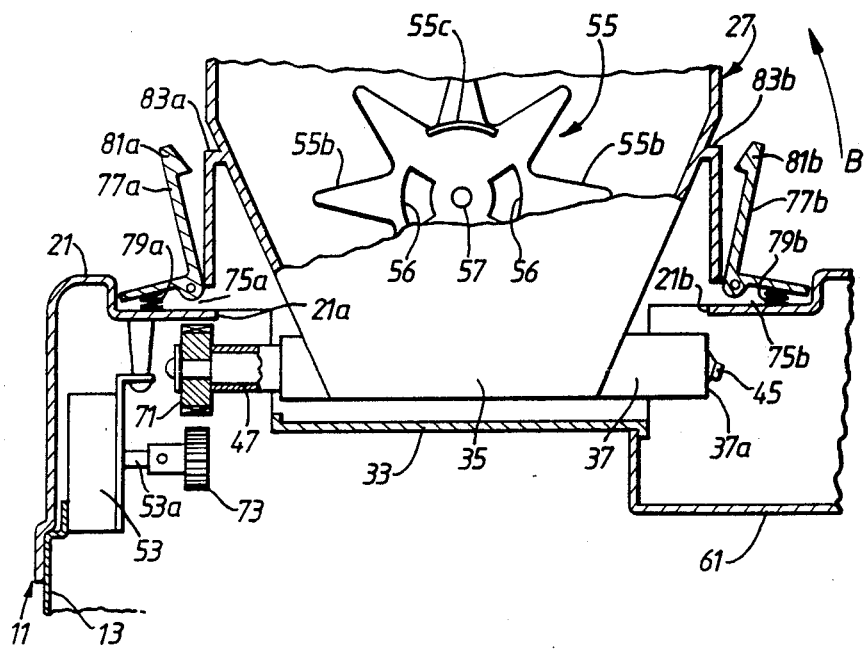

Another embodiment of the present invention will be described with reference to FIGS. 6 and 7.

In this embodiment, a driven gear 71 is fixed at the other end 47b of connecting shaft 47, instead of coupling member 49 as in the first embodiment. A driving gear 73 also is fixed at the top of driving shaft 53a of driving device 53, instead of coupling bar 51 of the first embodiment. Driving ngear 73 and driven gear 71 are operably engaged with one another when detergent supply apparaus 27 is mouned on V-shaped supporting member 33, as shown in FIG. 6.

A pair of depressed portions 75a and 75b are formed on raised portion 21 of washing machine 11. Depressed portion 75a extends from the left side aperture edge 21a of raised portion 21, and depressed portion 75b similarly extends from the right side aperture edge 21b of raised portion 21. A pair of pivoted L-shaped members 77a and 77b are individually positioned at the pair of depressed portions 75a and 75b, as shown in FIG. 6. A compressed spring 79a is positioned between left side depressed portion 75a and one end of L-shaped member 77a. A hook 81a is formed at the other end of L-shaped member 77a. Hook 81a is urged toward storage body 29 of detergent supply apparatus 27 bys pring 79a. A depressionn 83a corresponding to hook 81a of L-shaped member 77a is formed at the left side surface 29a of storage body 29. Hook 81a is detachably engaged with depression 83a when detergent supply apparatus 27 is mounted on V-shaped supporting member 33.

Similarly, a compressed spring 79b is positioned between right side depressed portion 75b and one end of L-shaped member 77b. A hook 81b is formed at the other end of L-shaped member 77b. A depression 83b corresponding to hook 81b is formed at the right side surface 29b of storage body 20. Hook 81b also is engaged with depression 83b by spring 79b.

In this embodiment also, detergent supply apparatus 27 may be removed from washing machine 11. When the ends of L-shaped members 77a and 77b are pressed against springs 79a and 79b, hooks 81a and 81b are disengaged from corresponding depressions 83a and 83b. Under this state, when detergent supply apparatus 27 is slightly lifted from v-shaped supporting member 33, driven gear 71 is disengaged from drivign gear 73, as shown in FIG. 7. Detergent supply apparatus 27 is then slanted in the direction indicated by arrow B, and may be removed from washing machine 11.

As can be understood from the above-described embodiment, the detergent supply apparatus of the present invention may smoothly convey a powdery detergent even if caked detergent is present herein, and may crush such caked detergent. Furthermore, the detergent supply apparatus may easily be cleaned by a liquid such a water.

In the embodiment described above, the detergent supply apparatus is detachably mounted on the washing machine. However, the detergent supply apparatus may be integrally formed with the washing machine. Furthermore, the detergent supply apparatus of this invention may be applied not only to washing machines but also to other washing apparatus, such as dish washers, which use a powdery detergent.

The present invention has been described with respect to specific embodiments. However, other embodiments based on the principles of the present invention should be obvious to those of ordinary skill in the art. Such embodiments are intended to be covered by the claims.

What is claimed is:

1. A washing apparatus having a washing tube, comprising:
    a casing having an upper wall including an opening through which the washing tub is accessible, the upper wall also having a rectangular aperture having a circumferential edge;
    a detergent supply device detachably mounted on the upper wall for communicating nwith an aintenrior of the casing through the rectangular aperture, including:
        a storage casing having side walls arranged opposite to one another for defininging a storage space in which a powdery detergent is stored;
        discharge opening means for discharging the detergent from the storage space;
        conveying means for conveying the detergent received from the storage space to the discharge opening emans, the conveying means having a first coupling element;
        a fixed pawl outwardly and substantially perpendicularly projecting from one side wall of the storage casing at which the first coupling element is positioned for engaging with the circumferential edge of the rectangular aperture of the upper wall; and
        a movable pawl formed to another side wall of the storage casing for engaging with the circumferential edge of the rectangular aperture of the upper wall, the movable pawl having a sloped portion which is gradually reduced toward the discharge opening emans, the sloped portion being associated with the circumferential eldge of the rectangular aperture of the upper wall for forcibly moving the movable pawl and for engaging the movable pawl with the circumferential edge of the rectangular aperture only by mounting the detergent supply device on the upper wall of the casing of the apparatus;
    means for driving the conveying means, the driving means including a second coupling element associated with the first coupling element for transmitting a driving force of the driving means to the conveying means;
    means for receiving the detergent from the discharge opening means; and
    means for supplying the detergent on the receiving means to the washing tub.

2. An apparatus according to claim 1, wherein the conveying means includes a coiled member including spaces between adjacent coils, the spaces between adjacent coils being exposed to the storage space for receiving the detergent therethrough.

3. An apparatus according to claim 2 further including means for stirring the detergent in the storage space.

4. An apparatus according to claim 3, wherein the stirring means includes a rotatable gear-shaped plate, and a wing substantially perpendicularly extending from the plate, the gear-shaped plate being rotated by the coiled member.

* * * * *